(12) United States Patent
Zhao et al.

(10) Patent No.: US 8,862,174 B2
(45) Date of Patent: Oct. 14, 2014

(54) METHOD, DEVICE AND SYSTEM FOR REPORTING POWER HEADROM

(75) Inventors: Yali Zhao, Beijing (CN); Li Chen, Beijing (CN); Guoqing Li, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 222 days.

(21) Appl. No.: 13/322,273

(22) PCT Filed: Jun. 11, 2010

(86) PCT No.: PCT/CN2010/073847
§ 371 (c)(1),
(2), (4) Date: Nov. 23, 2011

(87) PCT Pub. No.: WO2010/145508
PCT Pub. Date: Dec. 23, 2010

(65) Prior Publication Data
US 2012/0083310 A1    Apr. 5, 2012

(30) Foreign Application Priority Data

Jun. 19, 2009  (CN) .......................... 2009 1 0087723

(51) Int. Cl.
| | |
|---|---|
| H04B 7/00 | (2006.01) |
| H04W 52/24 | (2009.01) |
| H04W 52/36 | (2009.01) |
| H04W 52/34 | (2009.01) |
| H04W 72/12 | (2009.01) |
| H04L 5/00 | (2006.01) |
| H04W 52/54 | (2009.01) |
| H04W 24/08 | (2009.01) |

(52) U.S. Cl.
CPC ........ H04W 52/367 (2013.01); H04W 72/1284 (2013.01); H04L 5/0007 (2013.01); H04W 52/365 (2013.01); H04W 52/34 (2013.01); H04W 52/54 (2013.01); H04W 24/08 (2013.01); H04L 5/001 (2013.01)
USPC ........... 455/522; 455/69; 455/67.11; 455/509

(58) Field of Classification Search
USPC ................ 455/522, 69, 67.11, 512, 515, 509, 455/452.1, 67.13; 370/329
See application file for complete search history.

(56) References Cited

U.S. PATENT DOCUMENTS

| | | | |
|---|---|---|---|
| 2010/0158147 A1* | 6/2010 | Zhang et al. ................. | 375/260 |
| 2010/0232385 A1* | 9/2010 | Hsu .............................. | 370/329 |

FOREIGN PATENT DOCUMENTS

| | | |
|---|---|---|
| CN | 101174886 | 5/2008 |
| CN | 101340711 | 1/2009 |
| CN | 101340712 | 1/2009 |
| WO | 2008155469 | 12/2008 |

* cited by examiner

OTHER PUBLICATIONS

ISR for related PCT/CN2010/073847 mailed on Sep. 9, 2010 and its English translation.

*Primary Examiner* — John J Lee
(74) *Attorney, Agent, or Firm* — Ladas & Parry, LLP (57) ABSTRACT

A method, device and system for reporting power headroom are provided, and the method includes the following steps: a user equipment determines whether it triggers power headroom reporting (PHR) (101); if triggering PHR, the user equipment reports power headroom independently or associatively basing on a component carrier (CC) or a power amplifier (PA) (102). The technical solution realizes power headroom reporting in a multi-carrier system by reporting power headroom independently or associatively basing on the CC or the PA, and can make a base station equipment process uplink scheduling better according to the power headroom coming from the user equipment.

18 Claims, 11 Drawing Sheets

R/R/E/LCID sub-header

| R | R | PH$_{CC1}$ | Oct 1 |
| R | R | PH$_{CC2}$ | Oct 2 |
| R | R | PH$_{CC3}$ | Oct 3 |
| R | R | PH$_{CC4}$ | Oct 4 |
| R | R | PH$_{CC5}$ | Oct 5 |

FIG. 7

| PH$_{CC1}$ | | | Oct 1 |
| PH$_{CC2}$ | PH$_{CC3}$ | | Oct 2 |
| | PH$_{CC4}$ | | Oct 3 |
| PH$_{CC5}$ | R | R | Oct 4 |

METHOD, DEVICE AND SYSTEM FOR REPORTING POWER HEADROM

CROSS-REFERENCE TO RELATED APPLICATIONS

This application is the U.S. National Stage of International Patent Application No. PCT/CN2010/073847 filed on Jun. 11, 2010, which claims priority to Chinese Patent Application Number 200910087723.9 filed on Jun. 19, 2009, the disclosures of which are hereby incorporated by reference in their entireties.

FIELD OF THE PRESENT INVENTION

The present invention relates generally to the field of communication technology, and more particularly to a method, device and system for reporting power headroom.

BACKGROUND OF THE PRESENT INVENTION

LTE (Long Term Evolution) system is the evolution of 3G (3rd Generation, the third generation communication technology) technology, it has progresses in system performance requirements, network deployment scenarios, network architecture and service support capabilities and so on, compared to 3G technology.

In LTE system, the maximum power which base station equipment allocated to the user equipment through the UL grant can not exceed the maximum transmitting power of the user equipment in the carrier. In order to feedback the current transmitting power of user equipment to base station, and facilitate the base station equipment configuring and scheduling in time, the user equipment has to report PH (Power Headroom) message. The reporting process is called PHR (Power Headroom Reporting). Therein, PH value is the difference between the maximum transmitting power of user equipment and the transmitting power of PUSCH (Physical Uplink Shared Channel), which user equipment estimated. The PH value can be calculated according to the following formula:

$$PH = P_{MAX} - P_{PUSCH};$$

Therein, PH is power headroom, $P_{MAX}$ is the maximum transmitting power of user equipment, and $P_{PUSCH}$ is the power used for transmitting PUSCH which carrying PHR message.

Figure 1:
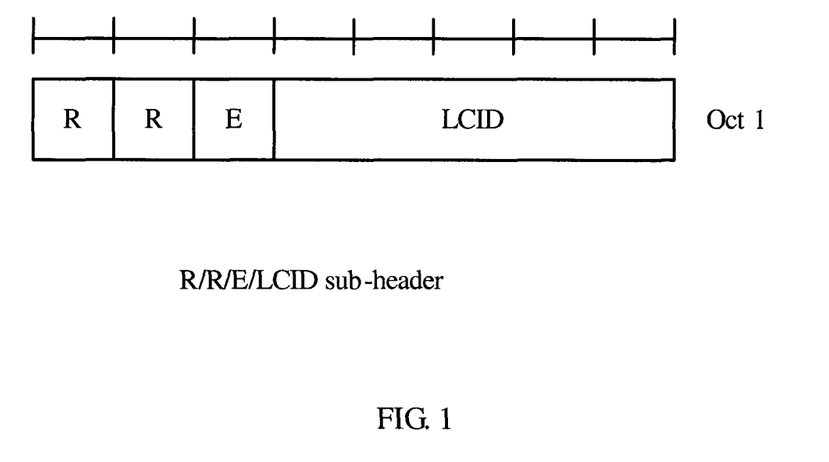
FIG. 1 is a structure diagram of MAC subheader in prior art.
Figure 2:
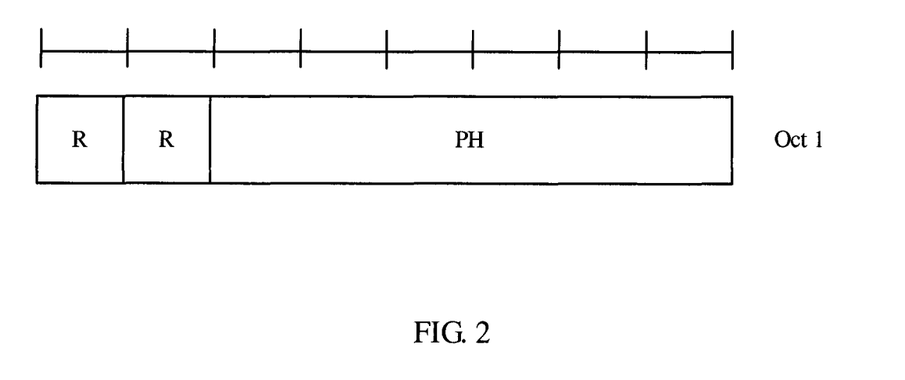
FIG. 2 is a structure diagram of MAC CE in prior art.

PHR reporting format includes a MAC (Media Access Control) subheader and a MAC CE (Control Element), respectively, as shown in FIG. 1 and FIG. 2.

Therein, LCID (Logical Channel ID) is used for identifying some of the logical channel number corresponding to the load, for reporting PHR, LCID is used for identifying the corresponding load as PHR; E is extension bit, which is used for identifying next byte that is MAC subheader or MAC load; R is reserved bit; PH is power headroom.

PHR-related parameters including the period of periodic PHR-Timer, length of prohibit PHR-Timer and the dl-Pathloss Change parameters for triggering PHR, above parameters are configured by RRC (Radio resource control) layer. PHR configuration parameters, as following:

```
phr-Config        CHOICE {
release           NULL,
setup             SEQUENCE {
periodicPHR-Timer ENUMERATED {sf10, sf20, sf50, sf100,
                    sf200,sf500, sf1000, infinity},
    //description: sf10 indicating the period of periodic
    PHR-Timer is 10 sub-frame,
the meaning of other parameters and so on.
prohibitPHR-Timer ENUMERATED {sf0, sf10, sf20, sf50,
                    sf100,sf200,
sf500, sf1000},
    //description: sf10 indicating the period of prohibitPHR-Timer
    is 10 sub-frame,
the meaning of other parameters and so on.
dl-PathlossChange ENUMERATED {dB1, dB3, dB6, infinity}
    //description: dB1 indicating the value of dl-PathlossChange
    is 1 dB, the
meaning of other parameters and so on.
    }
```

Corresponding with the PHR-related parameter, the trigger conditions comprising:

1. Uplink resources in said user equipment is available, prohibitPHR-Timer expires, and the pathloss changes from the most recent PHR over dl-PathlossChange dB;

2. periodicPHR-Timer expires;

3. high layers configure PHR initially or re-configures PHR.

When any of the above condition is satisfied, user equipment triggers PHR, informs physical layer to calculate PH value, and informs Multiplexing and Assembly process to generate PHR MAC CE; Start/re-start periodicPHR-Timer and prohibitPHR-Timer; cancels all PHR triggered.

However, in the LTE system applying to said PHR mechanism, there is one carrier in a cell, and the cell is called signal-carrier cell. According to LTE system protocol, the maximum bandwidth which can be transmitted is 20 MHz in signal-carrier cell, and the lower bandwidth can not fully meet the increasing user demand for high transmission rates. Based on the above, generating the LTE-A (LTE-Advanced, Advanced Long Term Evolution) system in communications technology field. Peak speed of the system has greatly improved over LTE, and the downlink speed is up to 1 Gbps, the uplink speed is up to 500 Mbps. Furthermore, LTE-A system with LTE system also has good compatibility.

In course of implementing the present invention, the inventor finds out there are at least the problems below in the present technology:

In the present technology, the PHR mechanism only applies to signal-carrier system, it can not apply to multi-carrier system as LTE-A, and it leads to user equipment in multi-carrier system can not report power headroom, and base station equipment can not uplink scheduling according to the power headroom user equipment reported.

SUMMARY OF THE PRESENT INVENTION

The embodiments of the present invention provide a method, device and system for reporting power headroom, to realize reporting power headroom in multi-carrier system.

The embodiments of the present invention provide a method for reporting power headroom, comprising the following steps:

The user equipment judging whether power headroom reporting is triggered;

If PHR is triggered, said user equipment reporting power headroom independently or associatively based on component carrier CC or power amplifier PA.

The embodiments of the present invention further provide a kind of user equipment, comprising:

A judging module, is used for judging whether power headroom reporting PHR is triggered;

A reporting module, is used for reporting power headroom independently or associatively based on component carrier CC or power amplifier PA, when said judging module judging triggering PHR.

The embodiments of the present invention further provide a system for reporting power headroom, comprising a user equipment and a base station equipment, said system cell uplink includes at least two component carrier CC, said user equipment set at least one power amplifier PA, Said base station equipment, is used for configuring PHR-related parameters for each CC or PA, and informing said PHR-related parameters to said user equipment by radio resources control RRC signaling;

Said user equipment, is used for judging whether power headroom reporting PHR is triggered, when trigging PHR, reporting power headroom independently or associatively based on CC or PA.

Comparing with present technology, the invention including the following advantages:

When there is any PHR trigger condition is satisfied, the technical solution realizes power headroom reporting in multi-carrier system by reporting power headroom independently or associatively based on the CC or the PA, and can make a base station equipment process uplink scheduling better according to the power headroom coming from the user equipment.

DETAILED DESCRIPTION OF THE EMBODIMENTS OF THE PRESENT INVENTION

For increasing peak rate, compatible with LTE system and meeting the need of full use of spectrum resources, LTE-A system introduces CA(Carrier Aggregation) technology for increasing bandwidth, which converges continuous or discontinuous carriers in the same cell, service for user equipments in the cell together, so as to provide higher data transmission rate. Uplink includes more than one CC (Component Carrier) of the cell applied to CC, rather than only one carrier as LTE system in wireless communication system before. The bandwidth between different CC can be same or different, however, for compatible with LTE system, the maximum bandwidth of each CC is limited to 20 MHz, and generally the maximum amount of CC is 5.

For multi-carrier system, user equipment is configured one or more PA (Power Amplifier), it has limitation of maximum transmitting power PMAX to each PA, the maximum transmitting power PMAX of PA is shared with all CC which the PA supported. Different PA can be configured different maximum transmitting power PMAX, and the maximum amount of PA is 2.

The technical solution of the embodiments of the present invention comprising: CC or PA based on multi-carrier system judges whether PHR is triggered, reports power headroom independently or associatively based on the CC or the PA, when there is any PHR trigger condition is satisfied.

In the following parts, detailed, clear and complete descriptions of the technology programs of the present invention are made combined with drawings of the embodiments. It is clear that the embodiments of the present invention described here are only parts of the embodiments of the present invention. According to the embodiments of the present invention, any other embodiments made by technical personnel of the field in the absence of creative work are all belong to the scope of the patent protection of the invention.

Figure 3:
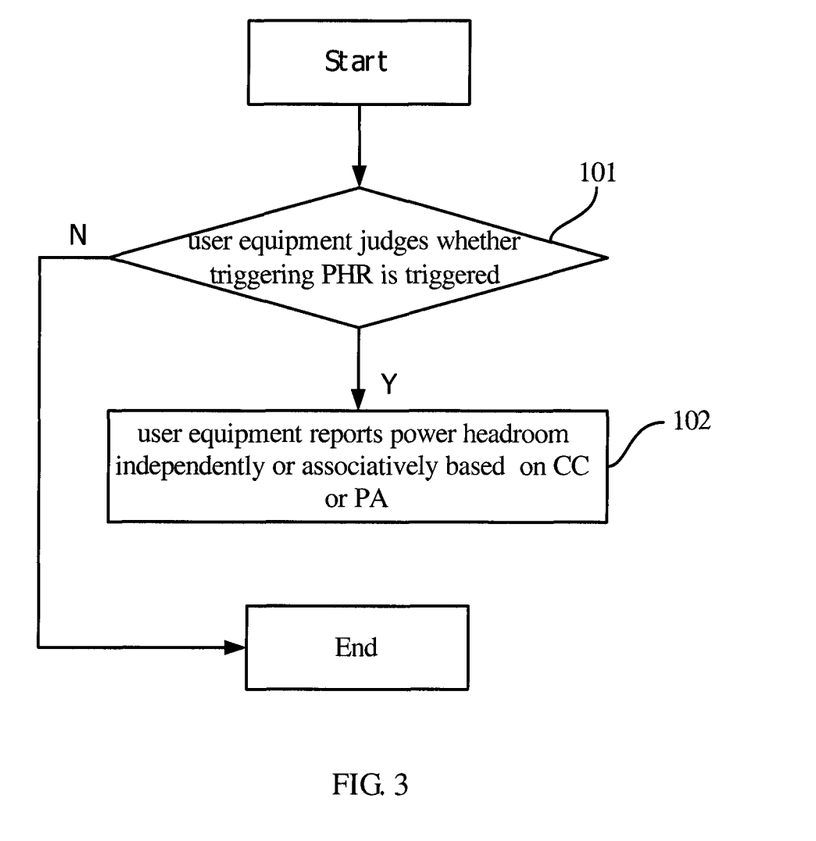
FIG. 3 is a flow diagram of a method for reporting power headroom of Embodiment 1 of the present invention.

As shown in FIG. 3, is a flow diagram of a method for reporting power headroom of Embodiment 1 of the present invention, applies to the multi-carrier system including user equipment and base station equipment, the multi-carrier system cell uplink including at least two CC, and the user equipment is set at least one PA. The method comprising the following steps:

Step 101, user equipment judges whether PHR is triggered, if PHR is triggered, performs step 102, if not, end the flow.

Specifically, each CC and PA of user equipment may be configured PHR-related parameters separately, the PHR-related parameters between different CC can be same or different; the PHR-related parameters between different PA can be same or different.

User equipment may judge whether there is any trigger condition is satisfied, according to PHR-related parameters configured for CC or PA separately.

Step 102, user equipment reports power headroom independently or associatively based on CC or PA.

Specifically, if the user equipment satisfies with any of the trigger condition in certain CC, the PHR of the CC may be triggered independently, as well as trigger PHR of all CC may be triggered associatively; if user equipment satisfies with any of the trigger condition in certain PA, the PHR of the PA may be triggered independently, as well as PHR of all PA may be triggered associatively;

When there is any trigger condition is satisfied, the embodiments of the present invention realize power headroom reporting in a multi-carrier system by reporting power headroom independently or associatively based on CC or PA, and can make a base station equipment process uplink scheduling better according to the power headroom coming from the user equipment.

Figure 4:
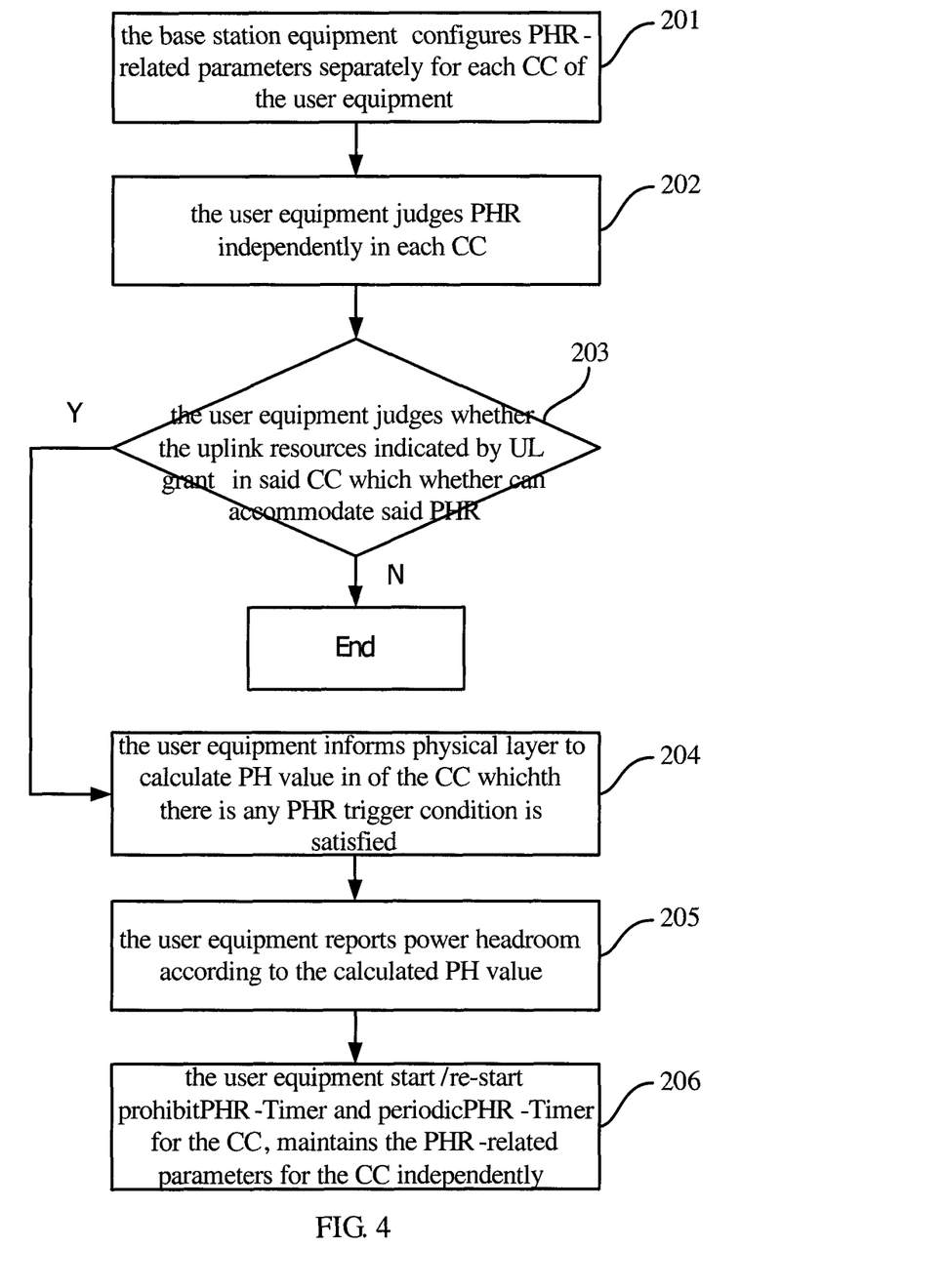
FIG. 4 is a flow diagram of a method for reporting power headroom of Embodiment 2 of the present invention.

As shown in FIG. 4, is a flow diagram of a method for reporting power headroom of embodiment 2 of the present invention, the method comprising the following steps:

Step 201, the base station equipment configures PHR-related parameters separately for each CC of the user equipment.

Herein, the PHR-related parameters between different CC can be same or different. The base station equipment informs PHR-related parameters for each CC to the user equipment by RRC signaling, and the CC indication within the signaling. The method of configuration applies to discontinuous carriers converge.

Step 202, the user equipment judges PHR independently in each CC.

Specifically, according to the PHR-related parameters configured for each CC, the user equipment judges whether there is any trigger condition is satisfied in each CC as following:

1. ProhibitPHR-Timer expires or has expired and the path loss has changed more than dl-PathlossChange dB since the last transmission of a PHR when the UE has UL resources for new transmission;
2. periodicPHR-Timer expires;
3. upon initial configuration or reconfiguration of the power headroom reporting functionality by upper layers.

When the PHR-related parameters configured for each CC satisfied with any of the above condition, the user equipment triggers PHR of the CC.

It should be noted that, the trigger conditions are not limited to the three conditions listed above.

Step 203, the user equipment judges whether the uplink resources indicated by UL grant (Up Link grant) in said CC can accommodate said PHR, if it can accommodate, performs step 204, if it can not accommodate, end the flow.

Herein, the PHR in CC there is any PHR trigger condition is satisfied use the LTE system PHR report format, and the format includes PHR MAC CE and PHR MAC subheader.

Figure 5:
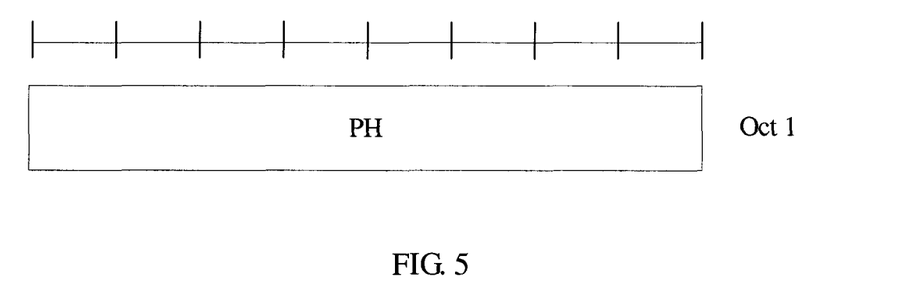
FIG. 5 is a structure diagram of MAC CE of Embodiment 2 of the present invention.

Specifically, if PHR calculating based on the maximum transmitting power of each CC, it can use PHR MAC subheader structure and the PHR MAC CE structure as shown in FIG. 1 and FIG. 2. If PHR calculating is based on the maximum transmitting power of PA, besides, the maximum transmitting power of LTE PA is closer to the maximum transmitting power of LTE-A PA, it can use PHR MAC subheader structure and the PHR MAC CE structure as shown in FIG. 1 and FIG. 2. When the maximum transmitting power of PA in LIE-A is much different to the maximum transmitting power of PA in LTE, it can report power headroom with one or two R domain of LTE PHR MAC CE, the PHR MAC CE structure as shown in FIG. 5. If PHR calculating is based on the maximum transmitting power of user equipment, and the user equipment supports multiple PA, it can report power headroom with one or two R domain of LTE PHR MAC CE, the PHR MAC CE structure as shown in FIG. 5.

Step 204, the user equipment informs physical layer to calculate PH value of the CC which there is any PHR trigger condition is satisfied.

Specifically, the PH value in the CC can be calculated according to the following formula:

$$PH_{CC}=P_{MAX\_CC}-P_{CC};$$

Therein, $PH_{CC}$ is PH value in CC, $P_{MAX\_CC}$ is maximum transmitting power of the CC, $P_{CC}$ is the transmitting power of the uplink subframe used for reporting power headroom.

Before the user equipment reporting power headroom independently, the base station equipment distributes the maximum transmitting power of user equipment to each CC based on the user equipment and the $P_{MAX\_CC}$ configured for PA. If $P_{MAX\_CC}$ is configured based on user equipment, then the sum of $P_{MAX\_CC}$ of all CC is equal to the maximum transmitting power of user equipment. If $P_{MAX\_CC}$ is configured based on PA, then the sum of $P_{MAX\_CC}$ of all CC supported by a PA is equal to the maximum transmitting power of the PA. $P_{MAX\_CC}$ configuration is determined according to the maximum transmitting power of user equipment, the PA configuration or user equipment configuration, the amount of PA in user equipment, the amount of CC each PA supported, the bandwidth of each CC, and so on.

After distributing $P_{MAX\_CC}$ for each CC, the base station equipment informs the user equipment by control signaling, make $P_{MAX\_CC}$ setting rule, and informs the rule to user equipment or defines it in protocol. Said control signaling includes $P_{MAX\_CC}$ of each CC, and the control signaling can be RRC signaling or L1/L2 signaling.

The PH value in CC also can be calculated according to the following formula:

$$PH_{CC}=P_{MAX}-P_{CC};$$

Therein, $PH_{CC}$ is PH value of CC, $P_{MAX}$ is maximum transmitting power of the user equipment or PA which includes the CC, $P_{CC}$ is the transmitting power uplink sub-frame required for user equipment reporting power headroom.

If $P_{MAX}$ is configured based on user equipment, then $P_{MAX}$ is the maximum transmitting power of the user equipment; If $P_{MAX}$ is configured based on PA, then $P_{MAX}$ is the maximum transmitting power of the PA which is included.

Step 205, the user equipment reports power headroom according to the calculated PH value.

Specifically, MAC layer of the user equipment generates the PHR MAC CE according to the PH value calculated by Physical layer, and reports power headroom in the first uplink resources indicated by UL grant in said CC can accommodate said PHR, cancels all triggered PHR in the CC.

Step 206, the user equipment start/re-start prohibitPHR-Timer and periodicPHR-Timer for the CC, maintains the PHR-related parameters for the CC independently.

When there is any PHR trigger condition is satisfied based on CC, the embodiments of the present invention reports power headroom independently for the CC, realize power headroom reporting in a multi-carrier system, and can make a base station equipment process uplink scheduling better according to the power headroom coming from the user equipment.

Figure 6:
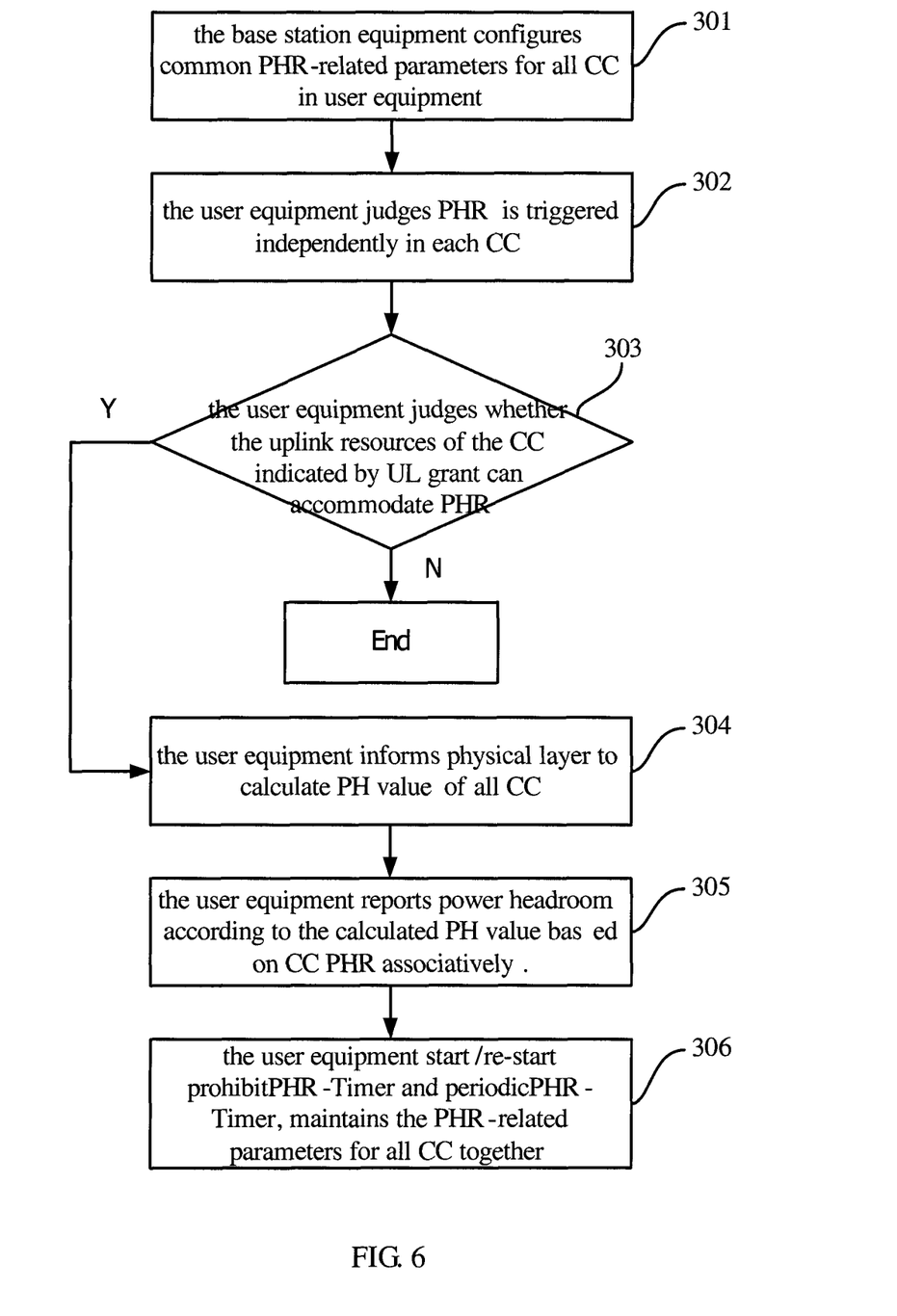
FIG. 6 is a flow diagram of a method for reporting power headroom of Embodiment 3 of the present invention.

As shown in FIG. 6, is a flow diagram of a method for reporting power headroom of Embodiment 3 of the present invention, the method comprising the following steps:

Step 301, the base station equipment configures common PHR-related parameters for all CC in user equipment, and informs the PHR-related parameters to the user equipment by RRC signaling. The method applies to continuous carriers converge.

Step 302, the user equipment judges PHR is triggered independently in each CC.

Specifically, according to common PHR-related parameters configured for all CC, the user equipment judges whether there is any PHR trigger condition is satisfied in each CC as following:

1. ProhibitPHR-Timer expires or has expired and the path loss has changed more than dl-PathlossChange dB since the last transmission of a PHR when the UE has UL resources for new transmission;
2. PeriodicPHR-Timer expires;
3. Upon initial configuration or reconfiguration of the power headroom reporting functionality by upper layers.

When the PHR-related parameters configured for each CC is satisfied with any of the above condition, the user equipment triggers all CC to report power headroom associatively.

It should be noted that, the trigger conditions are not limited to the three conditions listed above.

Step 303, the user equipment judges whether the uplink resources of the CC indicated by UL grant can accommodate PHR, if it can accommodate, performs step 304, if it can not accommodate, end the flow.

Therein, PHR in all CC use the association report format, and the format includes PHR MAC CE and PHR MAC sub-header.

Figure 7:
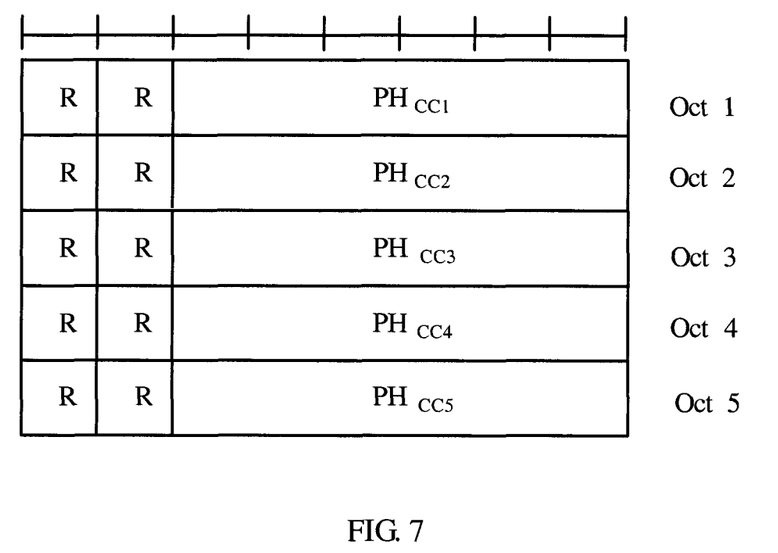
FIG. 7 is a structure diagram of MAC CE of Embodiment 3 of the present invention.
Figure 8:
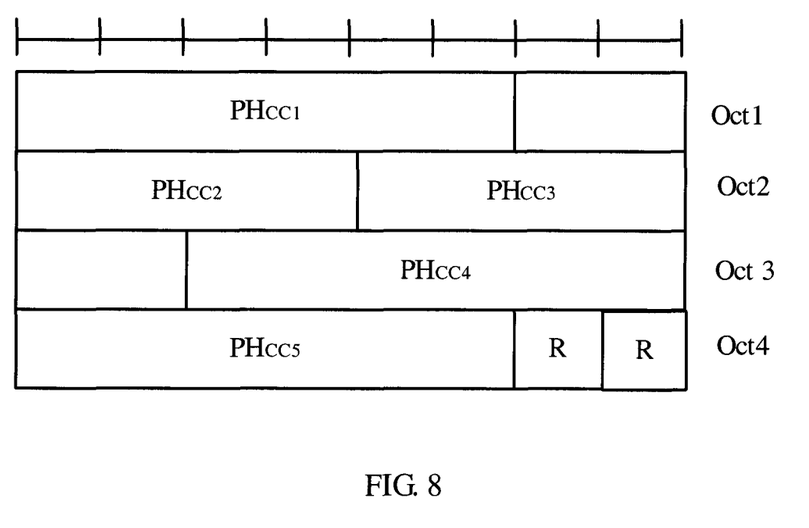
FIG. 8 is other structure diagram of MAC CE of Embodiment 3 of the present invention.

Specifically, if PHR calculating is based on the maximum transmitting power of each CC, and the amount of CC LTE-A system supported is no more than 5, so it can extend the report format of current LTE system, as shown in FIG. 7; To save costs, R domain reserved for LTE systems can be used. PHR report format is as shown in FIG. 8. To further reduce report costs, differential reporting between the various CC can be used also, R-bit is not limited to the position shown in the Figs.

Figure 9:
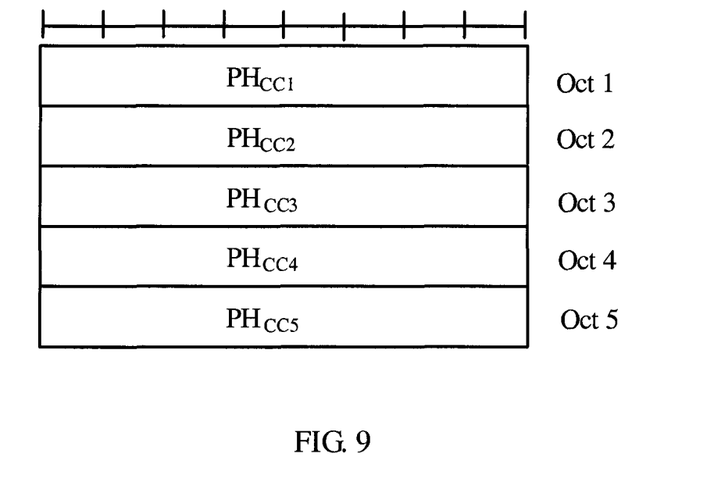
FIG. 9 is another structure diagram of MAC CE of Embodiment 3 of the present invention.

If PHR calculating is based on the maximum transmitting power of PA, besides, the maximum transmitting power of LTE-A PA is closer to the maximum transmitting power of LTE PA, it can use the PHR MAC CE structure as shown in FIG. 7 or 8. Otherwise, it can use one or two R domain of LTE PHR MAC CE, the LTE PHR MAC CE structure is as shown in FIG. 9.

If PHR calculating is based on the maximum transmitting power of user equipment, and the user equipment supports multiple PA, it can use LTE PHR MAC CE R-domain of LTE PHR MAC CE in LTE system, the PHR MAC CE structure as shown in FIG. 8. Therein, $PH_{CC_i}$ is the i-th CC uplink power headroom.

The meaning of MAC header and the meaning of the domains in PHR MAC CE structure are consistent with the LTE systems. To multi-CC PHR associatively, MAC sub-header LCD value is same or different with the LCD in single-CC PHR independently. If the values are same, there is only one kind of PHR format, and if the values are different, variety of PHR formats can coexist.

Step 304, the user equipment informs physical layer to calculate PH value of all CC.

Specifically, the PH value in the CC can be calculated according to the following formula:

$$PH_{CC}=P_{MAX\_CC}-P_{CC};$$

Therein, $PH_{CC}$ is PH value in CC, $P_{MAX\_CC}$ is maximum transmitting power of the CC, $P_{CC}$ is the transmitting power of the uplink subframe used for reporting power headroom.

The base station equipment distributes the maximum transmitting power of user equipment to each CC based on the user equipment and the $P_{MAX\_CC}$ configured for PA. If $P_{MAX\_CC}$ is configured based on user equipment, then the sum of $P_{MAX\_CC}$ of all CC is equal to the maximum transmitting power of user equipment. If $P_{MAX\_CC}$ is configured based on PA, then the sum of $P_{MAX\_CC}$ of all CC supported by PA is equal to the maximum transmitting power of the PA. $P_{MAX\_CC}$ configuration is determined according to the maximum transmitting power of user equipment, the PA configuration or user equipment configuration, the amount of PA in user equipment, the amount of CC each PA supported, the bandwidth of each CC, and so on.

After distributing $P_{MAX\_CC}$ for each CC, the base station equipment informs the user equipment by control signaling, make $P_{MAX\_CC}$ setting rule, and informs the rule to user equipment or defines it in protocol.

Step 305, the user equipment reports power headroom according to the calculated PH value based on CC PHR associatively.

Specifically, MAC layer of the user equipment generates the PHR MAC CE according to the PH value calculated by Physical layer, and reports power headroom associatively based on CC in uplink resources indicated by UL grant accommodate said PHR, cancels all triggered PHR in the CC.

Step 306, the user equipment start/re-start prohibitPHR-Timer and periodicPHR-Timer, maintains the PHR-related parameters for all CC together.

When there is any PHR trigger condition is satisfied based on CC, the embodiments of the present invention reports power headroom associatively for all CC, realize power headroom reporting in a multi-carrier system, and can make a base station equipment process uplink scheduling better according to the power headroom coming from the user equipment.

Figure 10:
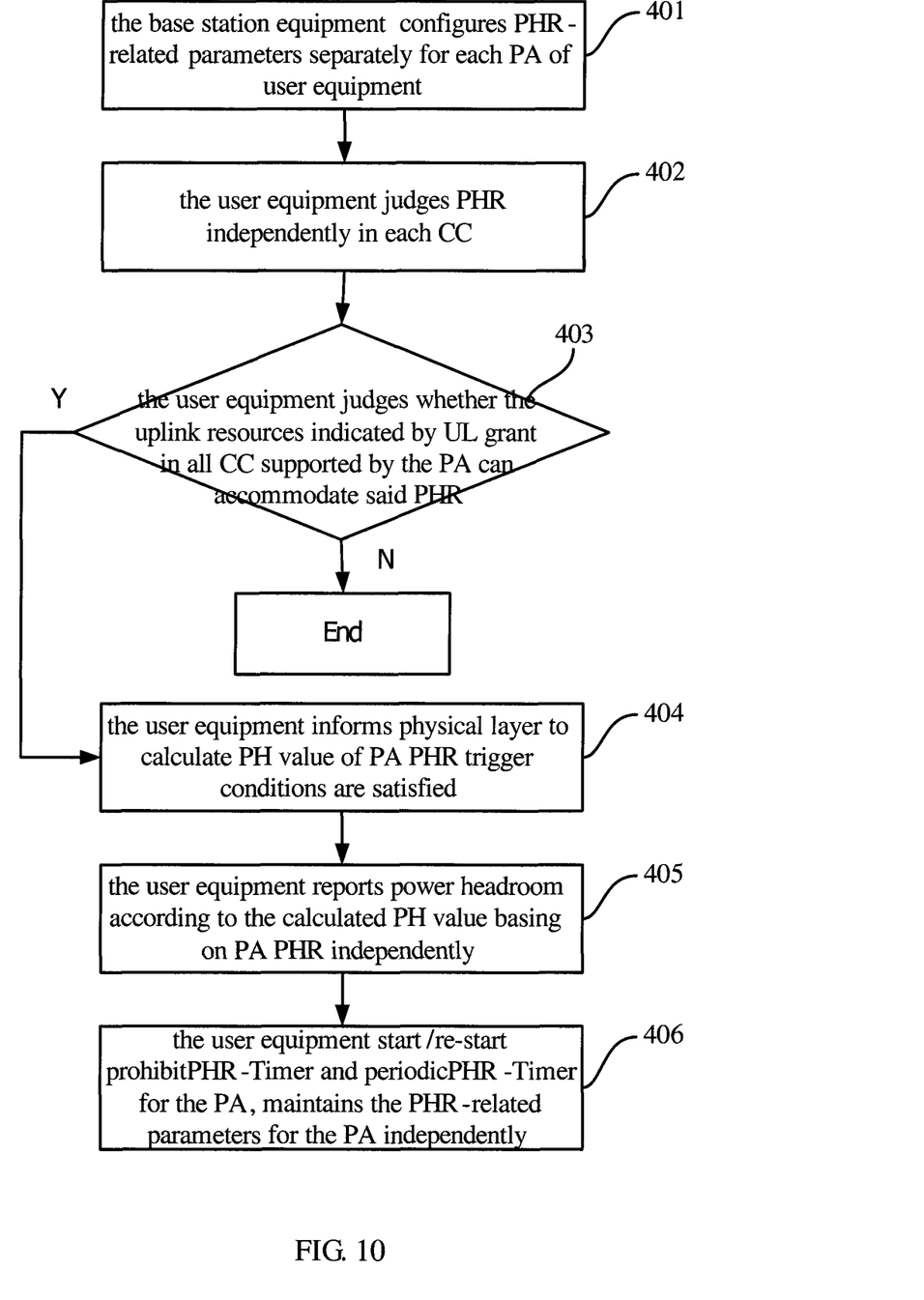
FIG. 10 is a flow diagram of a method for reporting power headroom of Embodiment 4 of the present invention.

As shown in FIG. 10, is a flow diagram of a method for reporting power headroom of Embodiment 4 of the present invention, the method comprising the following steps:

Step 401, the base station equipment configures PHR-related parameters separately for each PA of user equipment.

Therein, the PHR-related parameters between different PA can be same or different. The base station informs PHR-related parameters of each PA to the user equipment by RRC signaling, and the PA indication within the signaling. The method of configuration applies to the situation that the interval of PA center frequency is larger.

Step 402, the user equipment judges PHR independently in each CC.

Specifically, according to the PHR-related parameters configured for each PA, the user equipment judges whether there is any PHR trigger condition is satisfied in each PA as following:

1. ProhibitPHR-Timer expires or has expired and the path loss has changed more than dl-PathlossChange dB since the last transmission of a PHR when the UE has UL resources for new transmission;
2. periodicPHR-Timer expires;
3. upon initial configuration or reconfiguration of the power headroom reporting functionality by upper layers.

When the PHR-related parameters configured for each CC is satisfied with any of the above condition, the user equipment triggers PHR of the CC.

It should be noted that, the trigger conditions are not limited to the three conditions listed above. Therein, judging pathloss can use any of the following method:

1. Compares the average pathloss change of all CCs supported by said PA with dl-PathlossChange configured for the PA;
2. Compares the greatest pathloss change amongst all CCs supported by said PA with dl-PathlossChange configured for the PA;
3. Compares the smallest pathloss change amongst all CCs supported by said PA with dl-PathlossChange configured for the PA;
4. Defines a data transmitting primary carrier for the PA, compares the pathloss change of the primary carrier defined for the said PA with dl-PathlossChange configured in the PA.

Step 403, the user equipment judges whether the uplink resources indicated by UL grant in all CC supported by the PA can accommodate said PHR, the PA is satisfied with any PHR trigger condition. If so, performs step 404, if not, end the flow.

Therein, the PHR in PA use PA report format independently, and the format includes PHR MAC CE and PHR MAC subheader.

Specifically, if PH calculating based on the maximum transmitting power of each PA, each PA PHR report format use MAC sub-header structure and the PHR MAC CE structure is as shown in FIG. 1 and FIG. 2; If the maximum transmitting power of LTE-A is greater than the maximum transmitting power of LTE PA, but not more than 4 times maximum transmitting power of LTE PA, it can use one or two R domain of LTE PHR MAC CE, the PHR MAC CE structure is as shown in FIG. 5.

If PH calculating in each PA is based on the maximum transmitting power of user equipment, it can use one or two R domain of LTE PHR MAC CE, the PHR MAC CE structure is as shown in FIG. 5.

Step 404, the user equipment informs physical layer to calculate PH value of PA which there is any PHR trigger condition is satisfied.

Specifically, the PH value in PA can be calculated according to the following formula:

$$PH_{PA} = P_{MAX} - \sum_{PA} P_{CC};$$

Therein, $PH_{PA}$ is PH value in PA, $P_{MAX\_CC}$ is maximum transmitting power of the PA, $\Sigma P_{CC}$ is the sum of transmitting power of the uplink sub-frame in all CC supported by the PA.

Step 405, the user equipment reports power headroom according to the calculated PH value based on PA PHR independently.

Specifically, MAC layer of the user equipment generates the PHR MAC CE according to the PH value calculated by Physical layer, and reports power headroom in said uplink resources indicated by UL grant in any said CC can accommodate said PHR, cancels all triggered PHR in the PA.

Step 406, the user equipment start/re-start prohibitPHR-Timer and periodicPHR-Timer for the PA, maintains the PHR-related parameters for the PA independently.

When there is any PHR trigger condition is satisfied based on PA, the embodiments of the present invention reports power headroom independently for PA, realize power headroom reporting in a carrier system, and can make a base station equipment process uplink scheduling better according to the power headroom coming from the user equipment.

Figure 11:
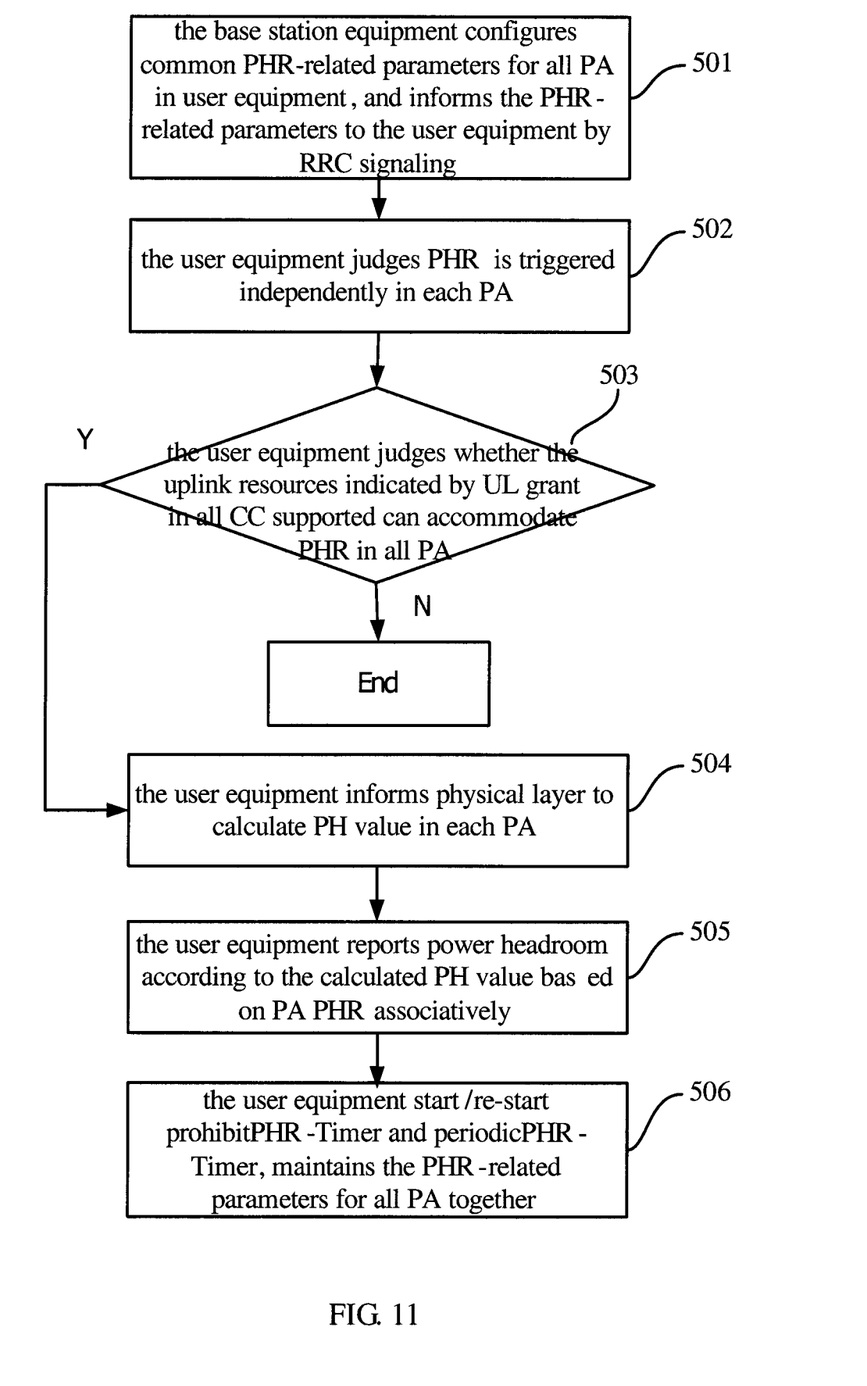
FIG. 11 is a flow diagram of a method for reporting power headroom of Embodiment 5 of the present invention.

As shown in FIG. 11, is a flow diagram of a method for reporting power headroom of Embodiment 5 of the present invention, the method comprising the following steps:

Step 501, the base station equipment configures common PHR-related parameters for all PA in user equipment, and informs the PHR-related parameters to the user equipment by RRC signaling.

Step 502, the user equipment judges PHR is triggered independently in each PA.

Specifically, according to common PHR-related parameters configured for all PA, the user equipment judges whether there is any PHR trigger condition is satisfied in each PA as following:

1. ProhibitPHR-Timer expires or has expired and the path loss has changed more than dl-PathlossChange dB since the last transmission of a PHR when the UE has UL resources for new transmission;
2. periodicPHR-Timer expires;
3. upon initial configuration or reconfiguration of the power headroom reporting functionality by upper layers.

When any PA of the user equipments PHR trigger condition is satisfied, it triggers all PA PHR associatively.

It should be noted that, the PHR trigger conditions are not limited to the three conditions listed above. Herein, judging pathloss in each PA can use any of the following method:

1. Compares the average pathloss change of all CCs supported by said PA with dl-PathlossChange configured for the PA;
2. Compares the greatest pathloss change amongst all CCs supported by said PA with dl-PathlossChange configured for the PA;
3. Compares the smallest pathloss change amongst all CCs supported by said PA with dl-PathlossChange configured for the PA;
4. Defines a data transmitting primary carrier for the PA, compares the pathloss change of the primary carrier defined for the said PA with dl-PathlossChange configured in the PA.

Step 503, the user equipment judges whether the uplink resources indicated by UL grant in all CC supported can accommodate PHR in all PA, if so, performs step 504, if not, end the flow.

Therein, the PHR in all PA use PA report format associatively, and the format includes PHR MAC CE and PHR MAC subheader.

Figure 12:
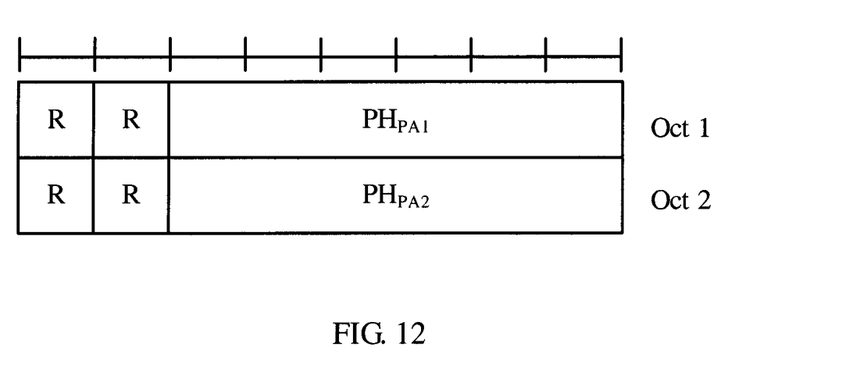
FIG. 12 is a structure diagram of MAC CE of Embodiment 5 of the present invention.
Figure 13:
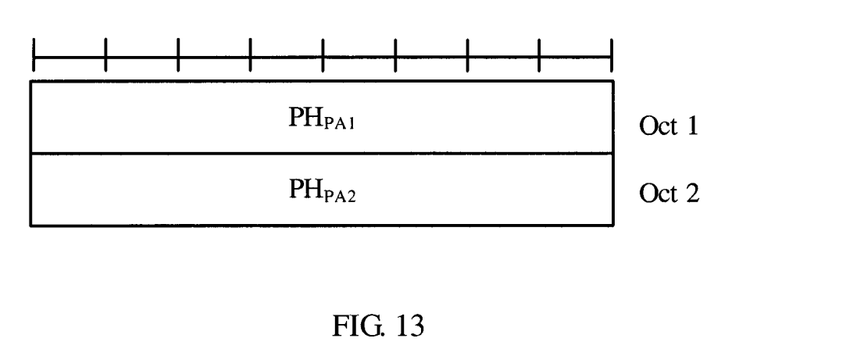
FIG. 13 is other structure diagram of MAC CE of Embodiment 5 of the present invention.

Specifically, if PH calculating in each PA is based on the maximum transmitting power of the PA, then PHR associatively based on PA report format as shown in FIG. 12; If PH calculating in each PA is based on the maximum transmit power of user equipment, it can use one or two R domain of LTE PHR MAC CE, the PHR MAC CE structure is as shown in FIG. 13.

Therein, the meaning of domains is consistent with the LIE system, MAC subheader LCID value is same or different with the LCID in single-CC PHR. If the values are same, there is only one kind of PHR format in PHR, and if the values are different, two kinds of PHR formats can coexist in PHR. $PH_{PA1}$ and $PH_{PA2}$ represents separately uplink power headroom of the first PA and uplink power headroom of the second PA.

Step 504, the user equipment informs physical layer to calculate PH value in each PA.

Specifically, the PH value of PA can be calculated according to the following formula:

$$PH_{PA} = P_{MAX} - \sum_{PA} P_{CC};$$

Therein, $PH_{PA}$ is PH value of PA, $P_{MAX\_CC}$ is maximum transmitting power of the PA, $\Sigma P_{CC}$ is the sum of transmitting power of uplink sub-frame in all CC supported by the PA.

Step 505, the user equipment reports power headroom according to the calculated PH value based on PA PHR associatively.

Specifically, MAC layer of the user equipment generates the PHR MAC CE according to the PH value calculated by Physical layer, and reports power headroom with the resources indicated by UL grant in the CC of user equipment can accommodate the PHR, cancels all triggered PHR in all PA.

Step 506, the user equipment start/re-start prohibitPHR-Timer and periodicPHR-Timer, maintains the PHR-related parameters for all PA together.

When there is any PHR trigger condition is satisfied based on PA, the embodiments of the present invention reports power headroom associatively for all PA, realize power headroom reporting in a carrier system, and can make a base station equipment process uplink scheduling better according to the power headroom coming from the user equipment.

Figure 14:
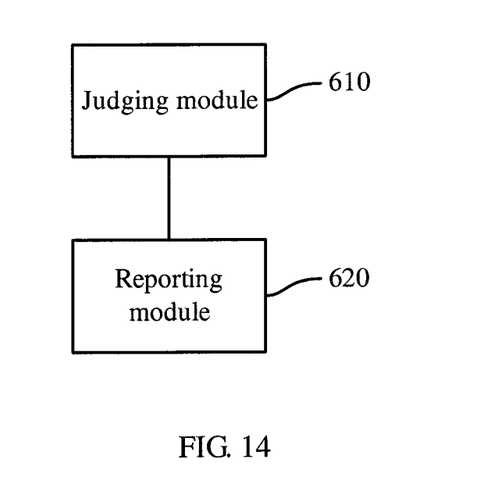
FIG. 14 is a structure diagram of a user device of Embodiment 6 of the present invention.

As shown in FIG. 14, is a structure diagram of a user device of Embodiment 6 of the present invention, applies to the multi-carrier system including user equipment and base station, the multi-carrier system cell uplink including at least two CC, and user equipment includes at least one PA. The user equipment comprising:

A judging module 610, is used for judging whether PHR is triggered.

The judging module 610 is specifically used for judging whether there is any PHR trigger condition is satisfied according to the PHR-related parameters configured for CC or PA. Each CC and PA of the user equipment is configured PHR-related parameters respectively, and the PHR-related parameters between different CC can be same or different; the PHR-related parameters between different PA can be same or different.

A reporting module 620, is used for reporting power headroom independently or associatively based on CC or PA, when judging module 610 judges PHR is triggered.

Specifically, if judging module 610 judges there is any PHR trigger condition is satisfied in certain CC, reporting module 620 may report power headroom independently in the CC, or may report power headroom associatively in all CC; If judging module 610 judges there is any PHR trigger condition is satisfied in certain PA, reporting module 620 may report power headroom independently in the PA, or may report power headroom associatively in all PA.

when reporting module 620 reports power headroom independently based on CC, is specifically used for judging whether the uplink resources indicated by CC UL grant can accommodate PHR, if so, calculates the PH value in the CC, generates PHR MAC CE according to the PH value, and send the PHR MAC CE in the uplink resources indicated by UL grant in the CC, which can accommodate the PHR.

It should be noted that the above modules can be distributed in a device and can also be spread across multiple devices. The modules can be combined into a module, and also can be further split into several sub-modules.

When there is any PHR trigger condition is satisfied, the embodiments of the present invention realize power headroom reporting in a multi-carrier system by reporting power headroom independently or associatively based on CC or PA, and can make a base station equipment process uplink scheduling better according to the power headroom coming from the user equipment.

Figure 15:
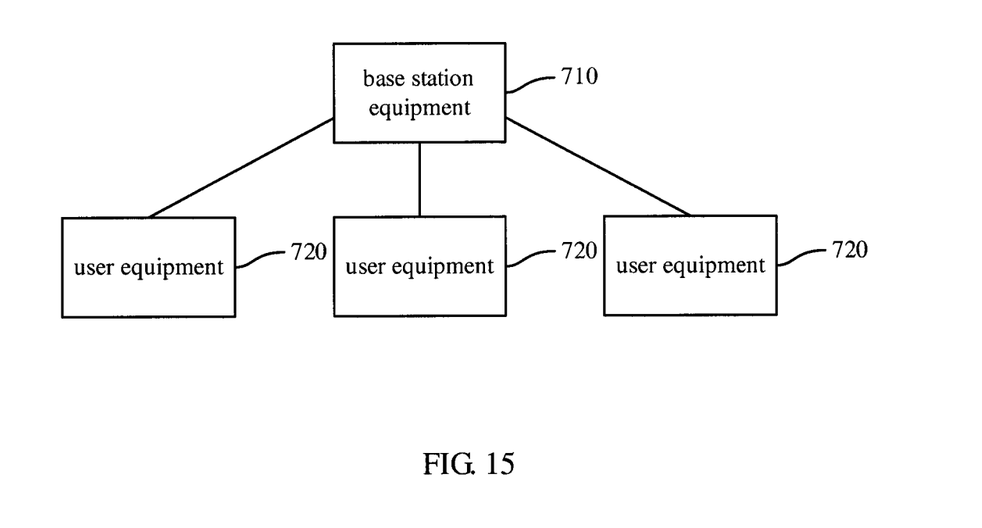
FIG. 15 is a structure diagram of reporting power headroom system of Embodiment 7 of the present invention.

As shown in FIG. 15, is a structure diagram of reporting power headroom system of Embodiment 7 of the present invention. The system comprising a base station 710 and a user equipment 720, the system cell uplink including at least two CC, and the user equipment is set at least one PA, therein, Base station equipment 710, is used for configuring PHR-related parameters for each CC or PA, and informing the PHR-related parameters to user equipment 720 by RRC signaling.

Therein, the PHR-related parameters between different CC can be same or different; the PHR-related parameters between different PA can be same or different.

The base station equipment 710, is also used for distributing power between CC supported by PA according to the maximum transmitting power of PA, and informing the maximum transmitting power of each CC to user equipment 720.

Specifically, after distributing the maximum transmitting power for each CC, base station equipment 710 informs the user equipment 720 by control signaling, make the maximum transmitting power setting rule, and informs the rule to user equipment 720, or defines it in protocol. Said control signaling includes the maximum transmitting power of each CC, and the control signaling can be RRC signaling or L1/L2 signaling.

User equipment 720, is used for judging whether PHR is triggered, when PHR is triggered, reports power headroom independently or associatively based on CC or PA.

Specifically, if user equipment 720 there is any PHR trigger condition is satisfied in certain CC, it may report power headroom independently in the CC, or may report power headroom associatively in all CC; If user equipment 720 there is any PHR trigger condition is satisfied in certain PA, it may report power headroom independently in the CC, or may report power headroom associatively in all PA.

When there is any PHR trigger condition is satisfied, the embodiments of the present invention realize power headroom reporting in a multi-carrier system by reporting power headroom independently or associatively based on CC or PA, and can make a base station equipment process uplink scheduling better according to the power headroom coming from the user equipment.

Through the description of the embodiments above, the technical personnel in this field can understand clearly that the present invention can be implemented by hardware or software and necessary current hardware platform. Based on this understanding, the technical program of the present invention can be embodied by a form of software products which can be stored in a nonvolatile storage medium (such as CD-ROM, U disk, mobile hard disk, etc.), including a number of instructions for making a computer device (such as personal computers, servers, or network equipments, etc.) implement the methods described in the embodiments of the present invention.

The technical personnel in this field can be understood that the illustration is only schematic drawings of a preferred embodiment, and the module or process is not necessary for the implementation of the present invention.

The technical personnel in this field can be understood that the modules can be distributed in device of the embodiments according to the description of the embodiments above, and also can be varied in one or multiply device of the embodiments. The modules of the embodiments can be combined into a module, and also can be further split into several sub-modules.

The number of the embodiments is only to describe, it does not represent the pros and cons of the embodiments.

The descriptions above are just preferred implement ways of the present invention. It should be pointed that, for general technical personnel in this field, some improvement and decorating can be done, which should be as the protection scope of the present invention.

The invention claimed is:

1. A method for reporting power headroom, comprising the following steps:
    judging whether power headroom reporting (PHR) is triggered by a user equipment;
    If PHR is triggered, said user equipment reporting power headroom independently or associatively based on component carrier CC or power amplifier PA;
    wherein, before said user equipment judging whether PHR is triggered, further comprising:
    a base station equipment configuring PHR-related parameters for each CC or PA, and informing said PHR-related parameters to said user equipment;

Said user equipment judging whether power headroom reporting is triggered, comprising:

Said user equipment judging whether there is any PHR trigger condition is satisfied according to the PHR-related parameters configured for CC or PA.

2. The method according to claim 1, wherein, said PHR-related parameters are included in radio resource control signaling.

3. The method according to claim 1, wherein, said PHR-related parameters comprise at least one of the following:

The period of periodicPHR-Timer, the length of prohibit-PHR-Timer, and the dl-Pathloss Change parameter for triggering PHR.

4. The method according to claim 3, wherein, said trigger conditions comprising at least one of the following:

ProhibitPHR-Timer expires or has expired and the path loss has changed more than dl -PathlossChange dB since the last transmission of a PHR when the UE has UL resources for new transmission;

ProhibitPHR-Timer expires;

upon initial configuration or reconfiguration of the power headroom reporting functionality by upper layers.

5. The method according to claim 4, wherein, when said user equipment judging whether there is any trigger condition is satisfied according to the PHR-related parameters configured for PA, the pathloss change from the most recent PHR comprising at least one of the following:

The average pathloss change of all CCs supported by said PA, the greatest pathloss change amongst all CCs supported by said PA, the smallest pathloss change amongst all CCs supported by said PA, and the pathloss change of the primary carrier defined for the said PA.

6. The method according to claim 1, wherein, said user equipment reporting power headroom independently based on CC, comprising:

Said user equipment confirming the uplink resources indicated by UL grant in said CC can accommodate said PHR, calculating the power headroom PH value of said CC, generating PHR media access control element MAC CE according to said PH value, and sending said PHR MAC CE in said uplink resources indicated by UL grant of said CC which can accommodate said PHR.

7. The method according to claim 6, wherein, said PH value is calculated in reference to at least one of the following:

The maximum transmitting power of said CC, maximum transmitting power of PA which includes said CC, and maximum transmitting power of said user equipment.

8. The method according to claim 7, wherein, when said PH value is calculated according to the maximum transmitting power of said CC, before said user equipment reporting power headroom independently or associatively based on CC, further comprising:

Said base station equipment distributing power between CC supported by said PA according to maximum transmitting power of PA, informing said maximum transmitting power of each CC to said user equipment, said maximum transmitting power of each CC is included in control signaling, said control signaling includes RRC signaling or L1/L2 signaling.

9. The method according to claim 1, wherein, said user equipment reporting power headroom associatively based on CC, comprising:

Said user equipment confirming the uplink resources indicated by UL grant of said CC, which can accommodate PHR of all CC, calculating PH value of all CC, generating PHR MAC CE according to said PH value, and sending said PHR MAC CE in said uplink resources indicated by UL grant in any said CC which can accommodate said PHR.

10. The method according to claim 1, wherein, said user equipment reporting power headroom independently based on PA, comprising:

Said user equipment confirming the uplink resources, which is indicated by UL grant in said CC supported by said PA, can accommodate said PHR, calculating PH value in said PA, generating PHR MAC CE according to said PH value, and sending said PHR MAC CE in said uplink resources indicated by UL grant of said CC which can accommodate said PHR.

11. The method according to claim 10, wherein, said PH value is calculated according to the maximum transmitting power of PA.

12. The method according to claim 1, wherein, said user equipment reporting power headroom associatively based on PA, comprising:

Said user equipment confirming the uplink resources indicated by UL grant of said CC can accommodate PHR of all PA, calculating PH value for all PA, generating PHR MAC CE according to said PH value, and sending said PHR MAC CE in said uplink resources indicated by UL grant in any said CC which can accommodate said PHR.

13. A user equipment, comprising:

A judging module, is used for judging whether power headroom reporting PHR is triggered;

A reporting module, is used for reporting power headroom independently or associatively based on component carrier CC or power amplifier PA, when said judging module judging triggering PHR;

wherein, said judging module is specifically used for judging whether there is any PHR trigger condition is satisfied according to the PHR-related s parameters configured in CC or PA.

14. The user equipment according to claim 13, wherein, when said reporting module reporting power headroom independently based on CC, is specifically used for judging whether the uplink resources indicated by UL grant in said CC can accommodate said PHR, if so, calculating the power headroom PH value in said CC, generating PHR media access control element MAC CE according to said PH value, and sending said PHR MAC CE in said uplink resources indicated by UL grant of said CC which can accommodate said PHR.

15. The user equipment according to claim 13, wherein, when said reporting module reporting power headroom associatively based on CC, is specifically used for judging whether the uplink resources indicated by UL grant of said CC can accommodate PHR of all CC, if so, calculating PH value in all CC, generating PHR MAC CE according to said PH value, and sending said PHR MAC CE in said uplink resources indicated by UL grant in any said CC which can accommodate said PHR.

16. The user equipment according to claim 13, wherein, when said reporting module reporting power headroom independently based on PA, is specifically used for judging whether the uplink resources indicated by UL grant in said CC supported by said PA can accommodate said PHR, if so, calculating PH value in said PA, generating PHR MAC CE according to said PH value, and sending said PHR MAC CE in said uplink resources indicated by UL grant of said CC which can accommodate said PHR.

17. The user equipment according to claim 13, wherein, when said reporting module reporting power headroom associatively based on PA, is specifically used for judging whether the uplink resources indicated by UL grant of said CC can accommodate PHR of all PA, if so, calculating PH value for all PA, generating PHR MAC CE according to said PH value, and sending said PHR MAC CE in said uplink resources indicated by UL grant in any said CC which is accommodate said PHR.

18. A system for reporting power headroom, comprising a user equipment of claim 13 and a base station equipment, said system cell uplink includes at least two component carrier CC, said user equipment includes at least one power amplifier PA, wherein, Said base station equipment, is used for configuring PHR-related parameters for each CC or PA, and informing said PHR-related parameters to said user equipment by radio resource control RRC signaling;

Said user equipment, is used for judging whether power headroom reporting PHR is triggered, when trigging PHR, reporting power headroom independently or associatively based on CC or PA.

* * * * *